UNITED STATES PATENT OFFICE.

WILHELM HIRSCHKIND, OF CARTAGO, CALIFORNIA, ASSIGNOR TO CALIFORNIA ALKALI COMPANY, OF SAN FRANCISCO, CALIFORNIA, A CORPORATION OF CALIFORNIA.

PREPARATION OF SODIUM SESQUICARBONATE.

1,396,841.     Specification of Letters Patent.     Patented Nov. 15, 1921.

No Drawing.     Application filed March 19, 1920. Serial No. 367,233.

*To all whom it may concern:*

Be it known that I, WILHELM HIRSCHKIND, a citizen of Bavaria, and a resident of Cartago, county of Inyo, State of California, have invented certain new and useful Improvements in Preparation of Sodium Sesquicarbonate, of which the following is a specification.

My invention relates to the preparation or purification of sodium sesquicarbonate or similar modified sodas, this application being a continuation in part of and a substitute for my prior pending application, Ser. No. 313,057, filed July 24, 1919. By the term modified sodas, I mean forms of soda containing more or less sodium bicarbonate.

This salt sodium sesquicarbonate is found in nature as trona or urao, more or less contaminated with other salts, such as sodium chlorid and sodium sulfate, and with insoluble matters such as sand and clay. Of all the carbonates of soda anhydrous or hydrated, acid or neutral, it is the one which combines ready solubility in water with permanence of composition to the highest degree, which quality gives it a high commercial value. It has, however, heretofore been difficult to recover it in pure form from the impure or crude natural trona or urao. One of the objects of my invention is to perfect a simple and efficient method whereby pure sodium sesquicarbonate may be obtained from such natural product.

Other objects, features and advantages of my invention appear more fully in the following description and appended claims.

In carrying out my invention I make use of the fact that sodium sesquicarbonate is soluble in greater amounts in a hot solution than in a cold solution. By dissolving the crude trona up to the saturation point in a hot solution, and then allowing the solution to cool, I am able to separate pure sodium sesquicarbonate from the other salts found in the crude trona, the latter salts remaining dissolved in the mother liquor while the sodium sesquicarbonate crystallizes out.

In carrying out my invention I also make use of the fact that sodium sesquicarbonate remains stable, that is, retains all of its carbonic acid, in an aqueous solution only when the solution contains a considerable chemical excess of sodium mono or normal carbonate (with or without equivalent sodium salts) over sodium bicarbonate, that is, the amount of sodium bicarbonate which will unite with the sodium mono carbonate in forming sodium sesquicarbonate. Investigations heretofore conducted have shown that such stability of the sesquicarbonate exists only when the solution contains before the addition of the sesquicarbonate between approximately 6% and 13% of its sodium content as bicarbonate, the balance being mono or normal carbonate or normal carbonate together with other sodium salts, such as sodium chlorid and sodium sulfate. I employ for dissolving the crude trona a solution containing such amount of the said salts for assuring the stability of the sodium sesquicarbonate. An example of a suitable solution will be given later.

Furthermore I have found that in order to reduce the difficulty of crystallizing out the pure sodium sesquicarbonate from the mother liquor on a commercial scale, it is desirable that the solution in which the crude trona is dissolved shall contain some salt or salts which reduce the solubility of the sodium sesquicarbonate. And such salts are preferably salts which may take the place of sodium carbonate in its tendency to render the solution suitable for maintaining the stability of the sodium sesquicarbonate therein; for example, sodium chlorid or its equivalent, sodium sulfate. Although best results are obtained with sodium salts, the reduced solubility may be obtained though to a less degree, with other salts. Where the mother liquor resulting from the crystallizing operation is not to be used again for the dissolving of a further amount of trona, a larger yield of pure sodium sesquicarbonate may be obtained by adding to the hot solution in which the impure trona is dissolved just before cooling same, a certain quantity of sodium chlorid or other salt which decreases the solubility of the sesquicarbonate. By reason of the low solubility of the sodium sesquicarbonate in a solution saturated with or containing a very large amount of sodium chlorid or other such solubility reducing salt, it may not be practical to use this step where the mother liquor from the crystallizing operation is to be used to dissolve further amounts of crude trona.

While a solution containing the desired content of sodium bicarbonate and other salt may be specially prepared, I have discovered that the brine produced from the waters of certain alkaline lakes, such as those of Searles lake and Owens lake in California, contain the desired ingredients in proper proportions for use in dissolving the crude trona without rendering the sodium sesquicarbonate unstable. A suitable brine produced from the waters of Owens lake for example has been found to contain the following salts in the specified percentages of the weight of the entire brine: sodium carbonate 9.80%; sodium bicarbonate 2.70%; sodium chlorid 11.30%; sodium sulfate 4.27%.

In carrying out one form of my improved process with such brine, I proceed as follows: First, the lake water is exposed to solar evaporation, which takes place relatively slowly, until a concentration is obtained such that the brine at ordinary atmospheric temperature would be at the saturation or precipitation point of sodium sesquicarbonate. If an already suitable brine is available this step may, of course, be omitted.

The concentrated brine is then heated more rapidly to a suitable higher temperature. In practice I find that satisfactory results are obtained where the temperature to which the brine is heated is approximately 100° C. This heating of the brine may be done in a suitable tank containing steam coils or pipes or other heating means. The crude trona crushed or broken into small pieces is then added to this solution and dissolved therein until a solution is obtained which is saturated with sodium sesquicarbonate at the temperature to which the brine has been heated. The hot solution is now filtered to remove the insoluble impurities such as sand and clay.

If the mother liquor from the crystallizing operation is not to be used to dissolve further crude trona, a suitable amount of common salt may be added at this point to decrease the solubility of the sodium sesquicarbonate in the solution. It is desirable not to add too large an amount of sodium chlorid as that would deposit sodium chlorid upon the crystallized sodium sesquicarbonate product. As an example, in the case of 100° C. heat, sodium chlorid may be added so as to bring the total content thereof in the brine up to 250 grams per liter.

The solution is now allowed to cool to a suitable temperature to cause the sodium sesquicarbonate to crystallize therefrom. In practice I have found that suitable results are obtained when the solution is allowed to cool to about 30° C. It is desirable that the crystals of sodium sesquicarbonate be fine, small and of uniform size; and to obtain such crystals, the solution is agitated during the step of cooling and crystallization. The agitation may be effected in any suitable way, for example mechanically or by forcing air into the solution. Under these conditions fine small needles of sodium sesquicarbonate of uniform size crystallize out during the cooling.

The crystals may then be separated from the mother liquor in any suitable manner. For example, the mixture of crystals and mother liquor may be run directly through a centrifuge or the crystals may be allowed to settle after which the liquor is drawn off and the crystals are transferred to the centrifuge. The crystals are then slightly washed with cool water and dried at a comparatively low temperature.

As heretofore stated, the mother liquor from the crystallizing operations may after reheating, be used again to dissolve a new quantity of crude trona provided it does not contain too large an amount of sodium chlorid and sodium sulfate. There will be a gradual accumulation in any event of sodium chlorid and sodium sulfate in the mother liquor which ultimately will compel the discarding of the mother liquor in whole or in part. One method of procedure is to discard after each crystallization a small part of the mother liquor and replace it with fresh brine so as to keep the sodium chlorid and sodium sulfate content of the solution in which the crude trona is dissolved, approximately constant.

While I have described the preferred manner of practising my invention, it will be obvious to those skilled in the art, after having understood my invention, that many modifications in the specific method set forth may be made without departing from the spirit or the scope of the invention.

Having now described my invention, what I claim as new and desire to protect by Letters Patent of the United States is:—

1. The process of preparing sodium sesquicarbonate, which consists in dissolving crude sodium sesquicarbonate or trona in a hot solution containing sodium bicarbonate and also sodium carbonate, the latter considerably in excess of the sodium bicarbonate, and allowing the solution to cool to cause sodium sesquicarbonate to crystallize from the solution.

2. The process of preparing sodium sesquicarbonate, which consists in dissolving crude sodium sesquicarbonate or trona in a hot solution containing sodium bicarbonate, sodium carbonate (the latter considerably in excess of the sodium bicarbonate,) and sodium chlorid, and allowing the solution to cool to cause sodium sesquicarbonate to crystallize from the solution.

3. The process of preparing sodium sesquicarbonate, which consists in dissolving crude sodium sesquicarbonate or trona in a hot solution containing sodium bicarbonate, sodium carbonate (the latter considerably in excess of the sodium bicarbonate,) and sodium chlorid, then adding sodium chlorid, and allowing the solution to cool to cause sodium sesquicarbonate to crystallize from the solution.

4. The process of preparing sodium sesquicarbonate, which consists in dissolving crude sodium sesquicarbonate or trona in a hot solution containing sodium bicarbonate and sodium carbonate, the latter considerably in excess of the sodium bicarbonate, the content of said solution in sodium carbonate and sodium bicarbonate before the addition of the trona being such that the solution at atmospheric temperature would be at the saturation point of sodium susquicarbonate, and allowing the solution to cool to cause sodium sesquicarbonate to crystallize from the solution.

5. The process of preparing sodium sesquicarbonate, which consists in dissolving crude sodium sesquicarbonate or trona in a hot solution containing sodium bicarbonate, sodium carbonate (the latter considerably in excess of the sodium bicarbonate) and sodium chlorid, the content of said solution in sodium carbonate and sodium bicarbonate before the addition of the trona being such that the solution at atmospheric temperature would be at the saturation point of sodium sesquicarbonate, then adding sodium chlorid, and allowing the solution to cool to cause sodium sesquicarbonate to crystallize from the solution.

6. The process of preparing sodium sesquicarbonate, which consists in dissolving crude sodium sesquicarbonate or trona in a hot solution containing sodium bicarbonate and sodium carbonate, the latter considerably in excess of the sodium bicarbonate, the sodium bicarbonate content of the solution being approximately between 6% and 13% of the total sodium content of the solution before the addition of the trona, and allowing the solution to cool to cause sodium sesquicarbonate to crystallize from the solution.

7. The process of preparing sodium sesquicarbonate, which consists in dissolving crude sodium sesquicarbonate, or trona in a hot solution containing sodium bicarbonate, sodium carbonate (the latter considerably in excess of the sodium bicarbonate) and sodium chlorid, the sodium bicarbonate content of the solution being approximately between 6% and 13% of the total content of the solution before the addition of the trona, and allowing the solution to cool to cause sodium sesquicarbonate to crystallize from the solution.

8. The process of preparing sodium sesquicarbonate, which consists in dissolving crude sodium sesquicarbonate or trona in a hot solution containing sodium bicarbonate, sodium carbonate (the latter considerably in excess of the sodium bicarbonate,) and sodium chlorid, the sodium bicarbonate content of the solution being approximately between 6% and 13% of the total sodium content of the solution before the addition of the trona and the sodium chlorid content of the solution being not over 250 grams per liter, and allowing the solution to cool to cause sodium sesquicarbonate to crystallize from the solution.

9. The process of preparing sodium sesquicarbonate which consists in slowly evaporating a solution containing sodium bicarbonate and sodium carbonate, the latter in excess of the sodium bicarbonate, until the solution has reached such concentration that at atmospheric temperature it would be at the saturation point of sodium sesquicarbonate, heating the solution more rapidly, dissolving trona or crude sodium sesquicarbonate therein to form a saturated solution at the temperature to which the solution is heated, filtering the solution to remove solid impurities, allowing the solution to cool to cause sodium sesquicarbonate to crystallize, separating the crystals thus formed from the mother liquor, washing said crystals, and drying the same.

In testimony whereof, I have signed my name to this specification.

WILHELM HIRSCHKIND.